United States Patent [19]

Gardner

[11] Patent Number: 5,503,419
[45] Date of Patent: Apr. 2, 1996

[54] CLOSE-COUPLED TANDEM BICYCLE

[76] Inventor: Robert I. Gardner, 64 State St., Willits, Calif. 95490

[21] Appl. No.: 246,672

[22] Filed: May 20, 1994

[51] Int. Cl.⁶ .............................. B62K 3/14; B62K 21/12
[52] U.S. Cl. ......................... 280/231; 280/273; 74/551.1
[58] Field of Search .................................. 280/231, 230, 280/263, 270, 273, 274, 281.1; 74/551.1, 551.3, 551.4, 551.5

[56] References Cited

U.S. PATENT DOCUMENTS

| | | | |
|---|---|---|---|
| 474,400 | 5/1892 | McKenna | 280/231 X |
| 2,715,342 | 8/1955 | Ridgway | 280/273 X |
| 3,092,362 | 6/1963 | Walsh | 280/231 X |
| 3,191,965 | 6/1965 | Wilkens | 280/231 |
| 3,943,797 | 3/1976 | Jollie | 74/594.4 |
| 4,002,351 | 1/1977 | Zuck | 280/278 |
| 4,029,326 | 6/1977 | Blow, Jr. | 280/7.16 |
| 4,600,206 | 7/1986 | DiPaolo | 280/231 |
| 4,666,172 | 5/1987 | Hartmann | 280/238 |
| 5,052,704 | 10/1991 | Nauman | 280/273 X |

FOREIGN PATENT DOCUMENTS 3213659  10/1983  Germany .
3234183   3/1984  Germany .

Primary Examiner—Kevin T. Hurley
Attorney, Agent, or Firm—James J. Leary; Carol A. Duffield

[57] ABSTRACT

A close-coupled tandem bicycle is described with a shorter wheelbase than a standard tandem bicycle and with the front and rear riders positioned closer together for easier communication and interaction between them. Two pedal cranks drive the rear wheel through a sprocket-and-chain drive. Both the front and rear passenger can steer the bicycle. A main handlebar with long handgrips extends rearward within easy reach of the rear passenger. A secondary handlebar attaches to the main handlebar and extends in front of it for use by the front passenger. The height and forward extension of the secondary handlebar is adjustable independently of the main handlebar so that both passengers can adjust the seat and the handlebars to their liking. The riding positions can be adjusted to allow two riders of different sizes, such as a child and an adult, to ride together in comfort. The close-coupled seating arrangement gives a child riding in the front seat a greater sense of safety than the head-to-tail arrangement of standard tandems. A blind or handicapped passenger can also ride in the front or rear position and truly participate in steering and controlling the bicycle with the increased sense of security of having another rider in close proximity. The fore-and-aft adjustability of the riding positions also allows two riders to move very close together so that they can ride in a closer, almost intimate, riding position perfect for taking romantic bicycle rides together.

12 Claims, 5 Drawing Sheets

CLOSE-COUPLED TANDEM BICYCLE

FIELD OF INVENTION

The present invention relates generally to bicycles. More particularly it relates to improvements in close-coupled tandem bicycles.

BACKGROUND OF THE INVENTION

Tandem bicycles for two or more riders arranged one behind the other are well known in the art. Typically, a standard tandem bicycle has a long wheelbase, much longer than a standard one person bicycle. The riders are arranged one behind the other with the front rider being in control of the steering of the bicycle. There is typically a second set of non-functional handlebars behind the front seat for the rear rider.

Standard tandem bicycles can be fast and a lot of fun, but they do have certain drawbacks. The long wheelbase of a tandem reduces the portability and maneuverability of the bicycle. The rear rider has no control over the steering of the bicycle, in fact many times the rear rider cannot even see over the front rider to look at the road ahead. This reduces the rear rider's control and sense of participation and, therefore, his or her fun in riding the bicycle. The rear rider is reduced to a mere "engine room" rather than an active participant in riding. Another disadvantage is the head-to-tail arrangement of the riders. Besides reducing the rear rider's view, it also separates the riders so that they cannot interact or communicate easily. This is a serious detriment for social or leisure riding. In fact, riders on a tandem bicycle may feel more isolated from one another than if they were riding side-by-side on separate standard bicycles.

Although the long wheelbase makes it somewhat awkward, a standard tandem bicycle can be ridden by a single rider in the front position; however, it cannot be ridden by a single rider in the rear position.

Close-coupled tandem bicycles are different from standard tandem bicycles in that the riders are situated much closer to one another, arranged front-to-back rather than head-to-tail. This arrangement allows the wheelbase of the bicycle to be significantly shortened. The shortened wheelbase improves the portability and maneuverability of the bicycle, while it brings the riders closer together allowing more interaction between them.

The simplest close-coupled tandem bicycles are, in fact, converted single-person bicycles. U.S. Pat. Nos. 4,002,351 and 4,029,326 both describe ways to convert a single-person bicycle into a close-coupled tandem bicycle by placing a second seat and a pedal crank behind the seat and pedal crank of the front rider. Both of these bicycles are made without any handlebars for the rear rider. The rear rider must support and balance him or herself by holding onto the front rider. This arrangement would be comfortable only for short rides and it gives no steering control to the rear rider.

German patent DE 3234183 describes a close-coupled tandem bicycle with a foldable handlebar for the rear rider that is attached to the frame in front of the front rider. The rear rider reaches around the front rider and grips the handlebar. This give the rear rider somewhere to hold onto, improving comfort and balance, but still gives no steering control to the rear rider.

Another German patent DE 3213659 addresses the problem of visibility from the rear seat of the tandem bicycle by raising the rear seat and pedal crank above the height of the front seat so that the rear passenger has a clear view over the head of the front passenger. This also allows for closer seating and a shorter wheelbase, as with a close-coupled tandem, but the arrangement is inflexible and it does not make any provision for steering control by the rear rider.

U.S. Pat. No. 3,191,965 describes a close-coupled tandem bicycle that has two pedal cranks, but one elongated seat for both riders, similar to the "banana seats" that were popular on children's bicycles of that time. The bicycle has an elongated handlebar with two sets of handgrips that allow either the front passenger or the rear passenger or both to control the steering. Because there is only a single seat and a single handlebar, the riders cannot both adjust the bicycle for their individual comfort. Unless the riders are precisely the same size, one or the other of them is bound to be uncomfortable with the seat position and/or the handlebar position.

What is lacking in the prior art is a close-coupled tandem bicycle which allows steering control by the front or the rear passenger and which is completely adjustable for the individual comfort of each of the passengers and for the desired degree of closeness between them.

SUMMARY OF THE INVENTION

In keeping with the foregoing discussion, an objective of the present invention is to provide a close-coupled tandem bicycle that allows a close seating arrangement between the front and rear passengers of the bicycle. This is desired in order to shorten the wheelbase of the bicycle for improved portability and maneuverability and to bring the riders closer together for easier communication and increased interaction between the riders. It is another objective of the invention to provide a tandem bicycle where both the front and rear passengers have control of the steering of the bicycle in order to increase their cooperation and their sense of participation in riding the bicycle. It is also an objective that each individual riding position be adjustable so that the seat heights and handlebar positions can be adjusted for the comfort and safety of each rider. One aspect of this objective is to make the riding positions adjustable fore and aft, as well as up and down, so that the front and rear passengers can be seated closer to one another or farther away as desired.

In order to fulfill these objectives, the present invention takes the form of a close-coupled tandem bicycle with a shortened wheelbase, as compared to standard tandem bicycles. The bicycle has a front seat and a rear seat. Each of the seats are adjustable up-and-down and fore-and-aft. Each passenger has a pedal crank which is linked to the rear wheel by a sprocket-and-chain drive assembly. The bicycle has a main handlebar with long hand grips that extend rearward within reach of the rear passenger. A secondary handlebar attaches to the main handlebar and extends in front of it for use by the front passenger. The height and forward extension of the secondary handlebar is adjustable independently of the main handlebar so that both passengers can adjust the seat and the handlebars to their liking.

The complete adjustability of the riding positions allows two riders of widely disparate sizes, such as a child and an adult, to ride together in comfort. The close-coupled seating arrangement gives a child riding in the front seat a greater sense of safety than the head-to-tail arrangement of standard tandems. This increased sense of security is also beneficial for riding with a passenger who is blind or handicapped; he or she can take the front or rear position and truly participate in steering and controlling the bicycle, with the safe feeling of having another rider in close proximity to help them. The fore-and-aft adjustability of the riding positions also allows two riders to move very close together so that they can ride in a closer, almost intimate, riding position. This option makes the present invention perfect for two people to take romantic bicycle rides together. Other objects and advantages of the invention will, no doubt, occur to those skilled in the art upon reading the following description along with the accompanying drawings.

DETAILED DESCRIPTION OF THE INVENTION

Figure 1:
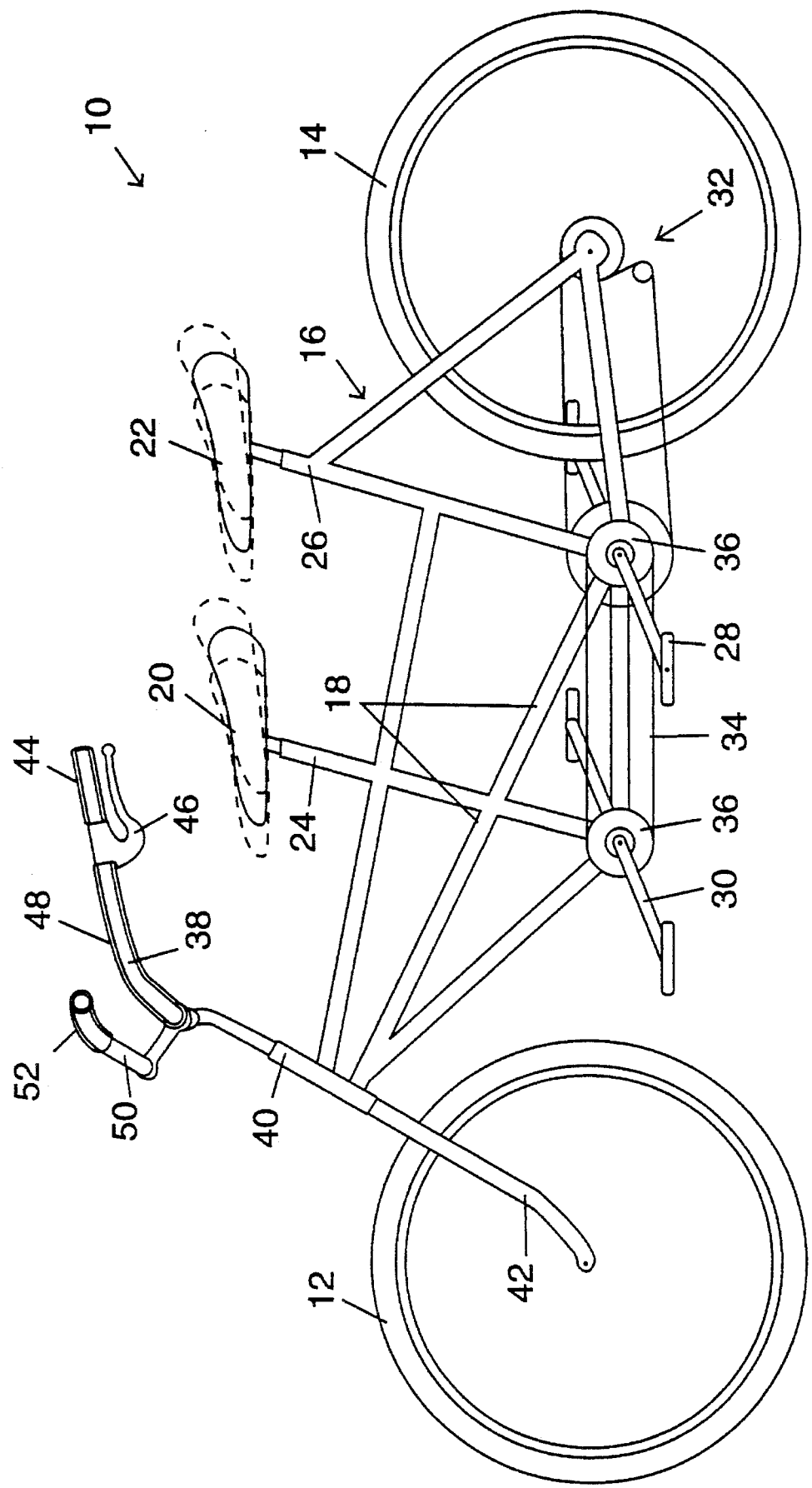
FIG. 1 shows a side view of a first embodiment of the close-coupled tandem bicycle of the present invention.

FIG. 1 shows a first embodiment of the present invention. The close-coupled tandem bicycle 10 has a front wheel 12 and a back wheel 14 which are connected by a frame 16. The frame 16 of the close-coupled tandem bicycle 10 is only about 12 inches longer than the frame of a standard single-person bicycle for a total length of about 55 inches from hub to hub. This is considerably shorter than the wheelbase of a regular tandem bicycle which is typically 68 to 70 inches. This makes the present invention very maneuverable compared to a regular tandem bicycle. The frame 16 is a step-through frame 16 which makes it easier to mount and dismount from the bicycle 10. The frame 16 is cross braced with a diagonal tube 18 for strength to support the weight of two riders.

The close-coupled tandem bicycle 10 has a front seat 20 and a rear seat 22, which are supported on the front seat tube 24 and the rear seat tube 26, respectively. The distance between the front seat tube 24 and the rear seat tube 26 is about 15.5 inches, which provides closer spacing between the seats 24, 26 than on a standard tandem bicycle. Each seat 24, 26 is adjustable six ways: up-and-down, fore-and-aft, and tilting forward and back. The seats 24, 26 can be individually adjusted to the proper height, tilt and position for each rider. The seats 24, 26 can also be moved closer or farther apart as desired. Each seat has associated with it a pedal crank 28, 30. The rear pedal crank 28 is linked to the rear wheel 14 by a sprocket-and-chain drive assembly 32. Preferably, the chain drive has a multi-speed derailleur or similar gear shifting mechanism. The illustrated embodiment has ten speeds provided by front and back derailleur systems. The front and rear pedal cranks 28, 30 are linked together with a second drive chain 34 and two equal-size sprockets 36 so that the pedal cranks 28, 30 turn synchronously. This is especially important in a close-coupled tandem because the front and rear riders' feet would interfere if the pedals rotated asynchronously.

The close-coupled tandem bicycle 10 has a main handlebar 38 connected to the handlebar stem 40, which in turn is connected to the front wheel 12 by the front fork 42. The main handlebar 38 has elongated handgrips 44 which extend rearward within easy reach of the rear passenger. In this embodiment, the entire main handlebar 38, except for the brake calipers 46, is covered with a cushioned grip material 48 so that the entire handlebar 38 can be used as handgrips 44 for the front or rear rider or both. Optionally, the bicycle also has a secondary handlebar 50 which is attached to the main handlebar 38 and which extends forward from the main handlebar 38. The secondary handlebar 50 has two handgrips 52 which can be used by the front rider. The secondary handlebar 50 provides a convenient and comfortable natural riding position for the front rider. Both of the riders can participate in the steering and control of the bicycle, but the main handlebar 38 provides greater leverage than the secondary handlebar 50 so the front rider cannot overpower the rear rider's control of the steering.

Figure 2:
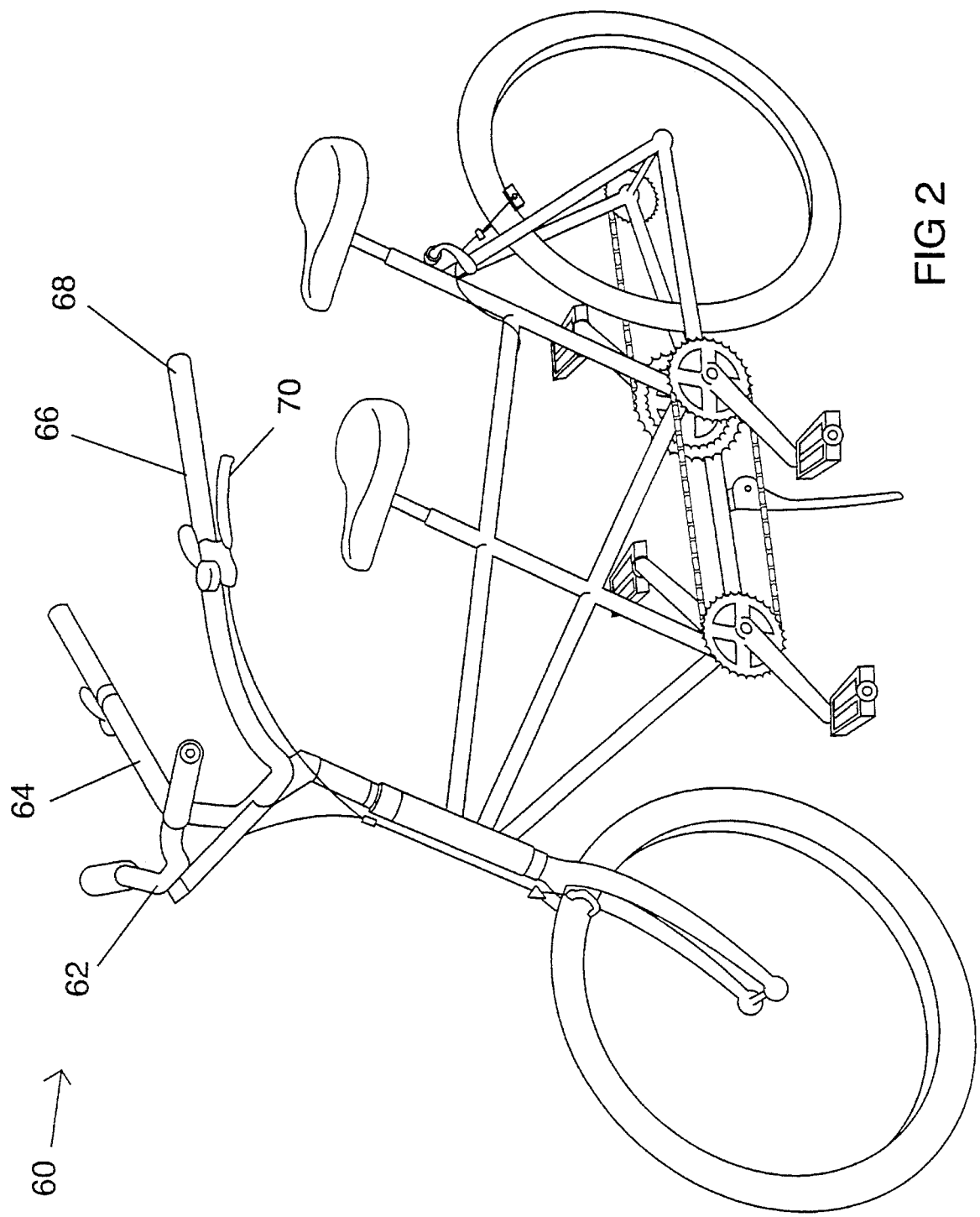
FIG. 2 is a perspective view of a second embodiment of the close-coupled tandem bicycle.
Figure 3:
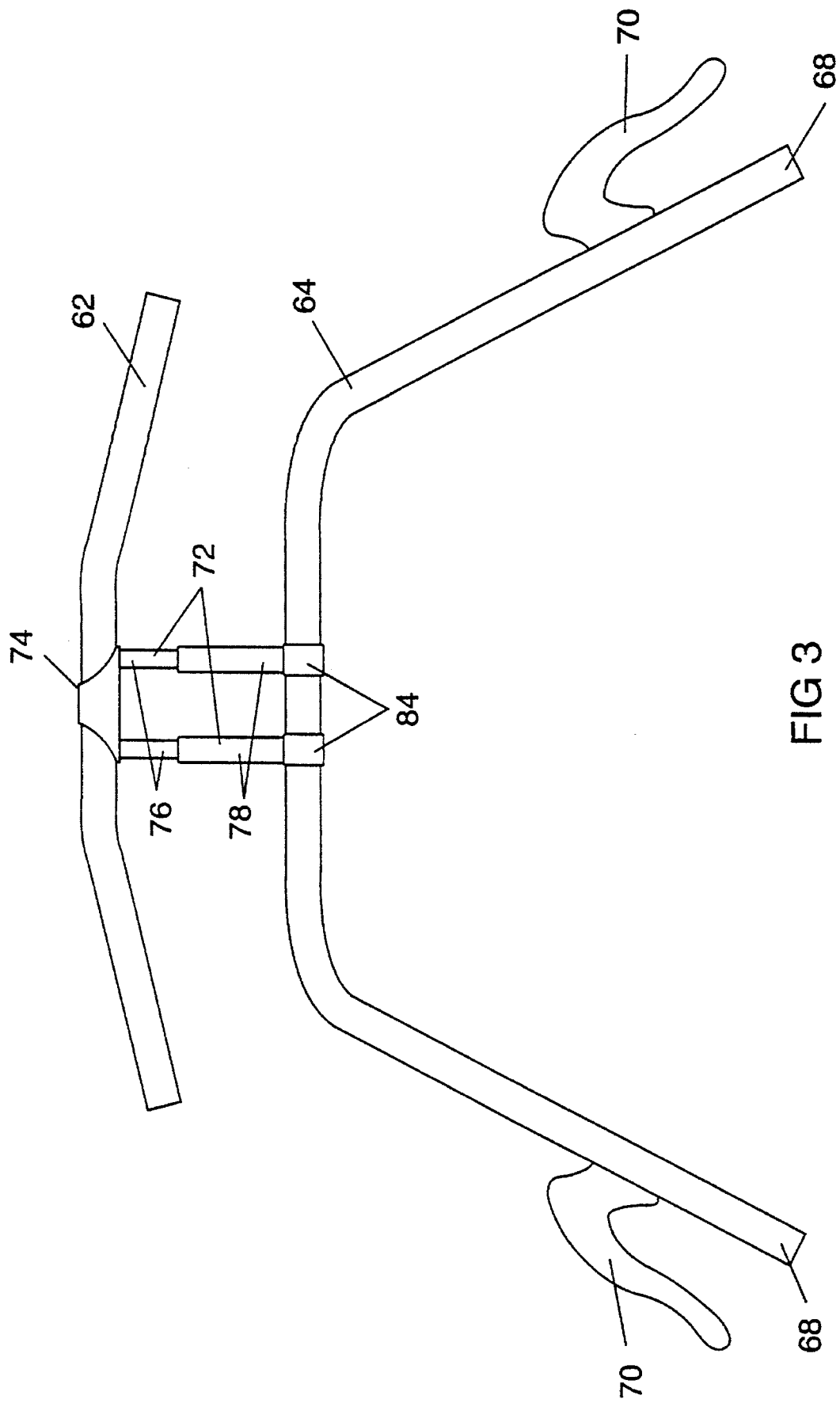
FIG. 3 is a detail drawing of the handlebars of the close-coupled tandem bicycle.

FIG. 2 shows a perspective view of a second embodiment of the close-coupled tandem bicycle 60 of the present invention. This embodiment is largely the same as the previously described embodiment, but it differs in that the fixed-position secondary handlebar 50 of the previous embodiment has been replaced by a multi-position adjustable secondary handlebar 62. The complete handlebar assembly, with the main handlebar 64 and the multi-position adjustable secondary handlebar 62, is shown in FIG. 3. The multi-position adjustable secondary handlebar 62 is attached to the main handlebar 64 and it extends forward from the main handlebar 64. The height and the forward extension of the handlebar 62 can be adjusted for the comfort of the front rider. In this embodiment the main handlebar 64 has also been slightly modified. As in the previous embodiment, the entire handlebar is covered with a cushioned grip material 66, but also the handgrips 68 have been extended behind the brake calipers 70 to create padded handgrips 68 which are large enough to accommodate two pair of hands.

Figure 4:
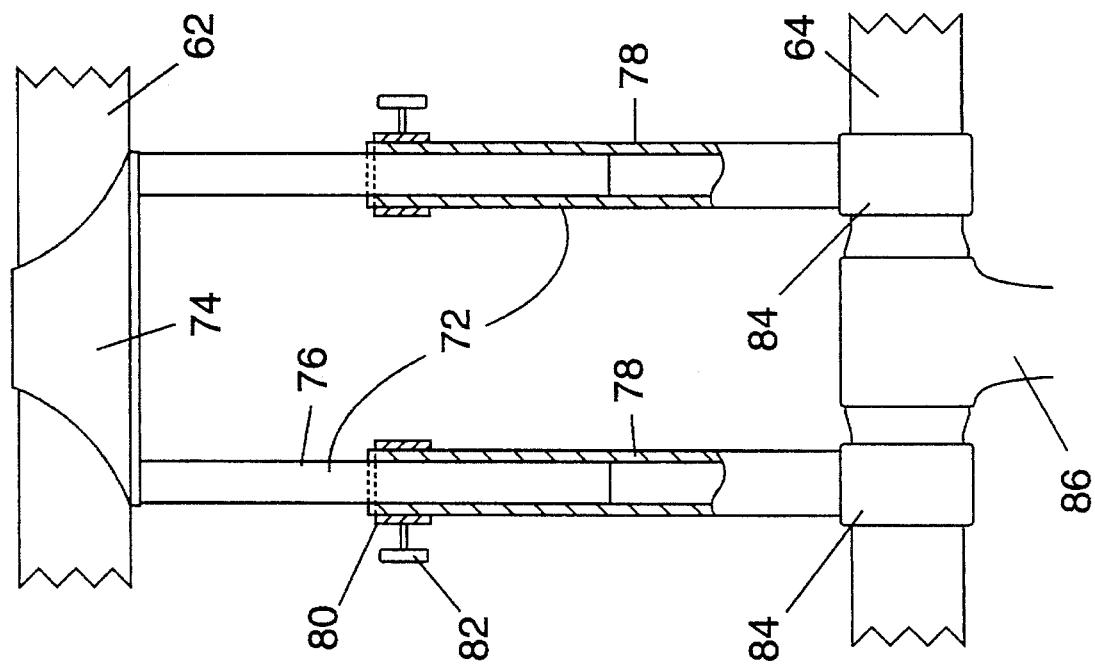
FIG. 4 is a detailed top view of the handlebar extension.
Figure 5:
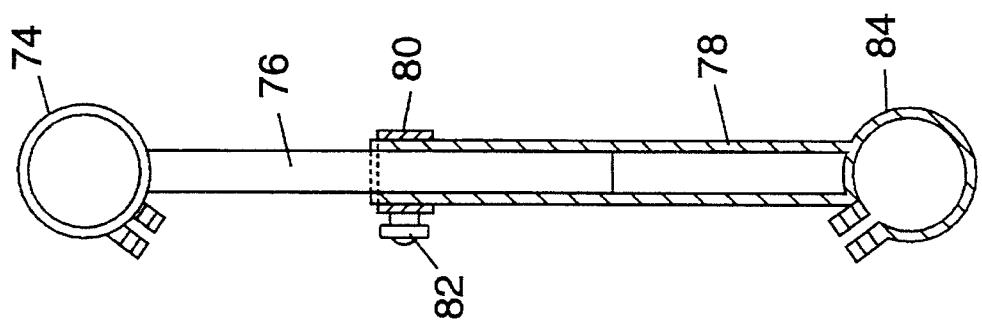
FIG. 5 is a detailed side view of the handlebar extension.

The secondary handlebar 62 is shown in more complete detail in FIGS. 4 and 5. The secondary handlebar 62 is supported by two telescoping extension tubes 72. A clamp 74 attaches the two telescoping extension tubes 72 to the secondary handlebar 62. The clamp 74 allows the angular tilt of the secondary handlebar 62 to be adjusted to the front rider's liking. Each extension tube 72 has an inner tube 76 and an outer tube 78 which slide together in a telescoping fashion to shorten or lengthen the telescoping extension tubes 72. The inner and outer tubes 76, 78 can be locked together in the desired position by the tube clamps 80 which are tightened by clamping screws 82. The telescoping extension tubes 72 are attached to the main handlebar 64 by a pair of clamps 84 that attach to the main handlebar 64 on either side of the handlebar stem 86. The height of the secondary handlebar 62 with respect to the main handlebar 64 can be adjusted by loosening the two clamps 84 and changing the angle of the telescoping extension tubes 72, while the forward extension can be adjusted by changing the length of the telescoping extension tubes 72. This allows the front rider to adjust the position of the secondary handlebar 62 for the most comfortable and efficient riding position.

Figure 6:
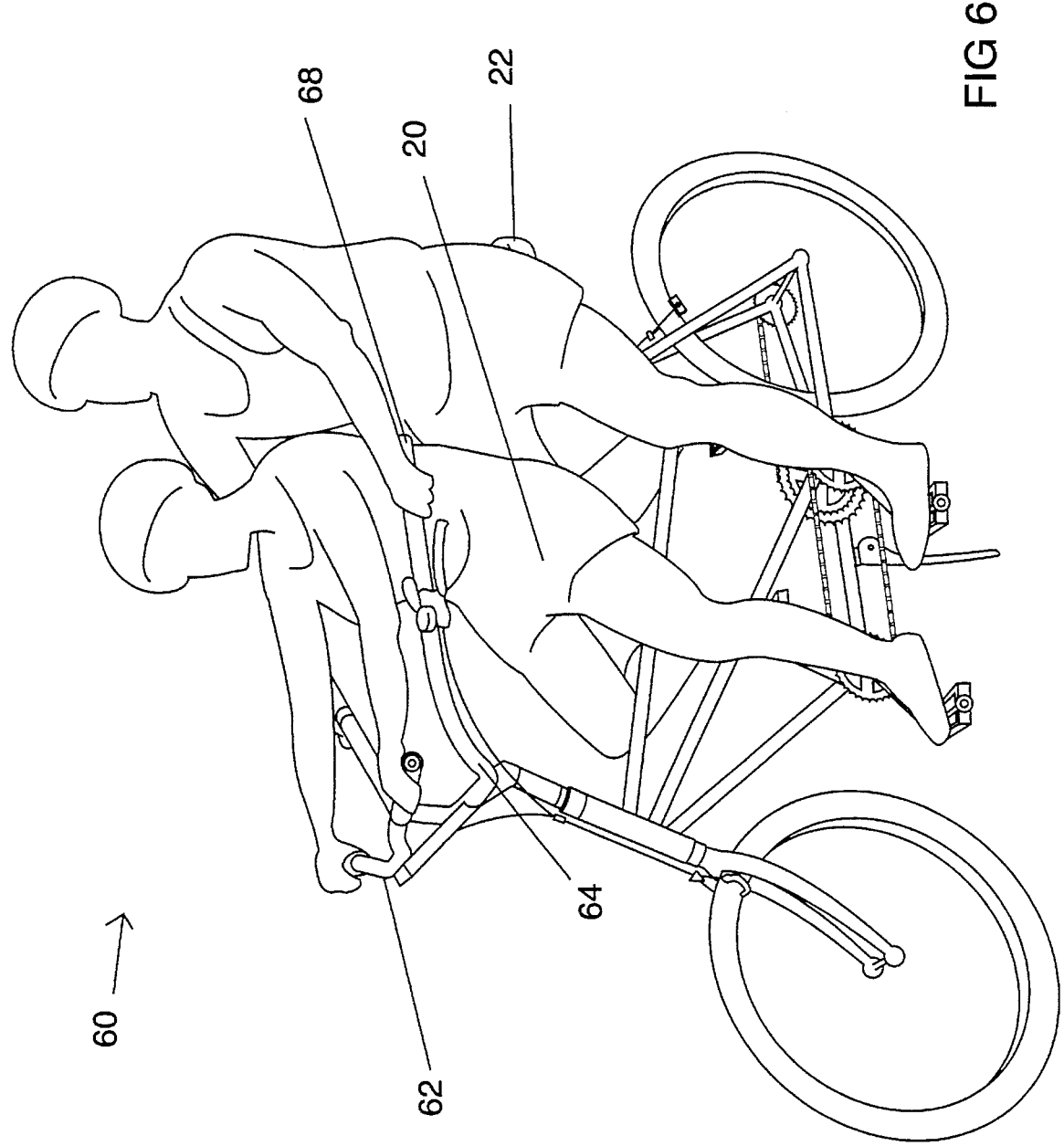
FIG. 6 is a perspective view of the close-coupled tandem bicycle with two riders.

FIG. 6 shows a perspective view of the close-coupled tandem bicycle 60 with two riders. As can be seen in this example, the seat 20, 22 positions and handlebar 62, 64 positions can be individually adjusted for comfortable use by riders of widely disparate sizes. Both riders have a clear view of the road ahead, and both the front and rear riders have control of the bicycle steering. A number of different seating arrangements can be accomplished with the close-coupled tandem bicycle 60 by varying the positions of the adjustable seats 20, 22 and the handlebars 62, 64. A closer, more romantic seating arrangement can be created by moving the rear seat 22 forward, then moving the front seat 20 rearward and shortening the telescoping extension tubes 72 to preserve the distance between the seat 20 and the handlebar 62. If desired, the two riders can even share the extended handgrips 68 at the ends of the main handlebar 64 to ride hand in hand. That way two people can take a romantic ride together almost cheek to cheek.

If desired, the front rider can control all of the steering of the bicycle and the rear rider can hold onto the front rider by the waist or the shoulders. Because the close-coupled tandem bicycle 10, 60 has a relatively short wheelbase, it can also be conveniently ridden by a single rider in either the front or the rear position.

Although the examples given include many specificities, they are intended as illustrative of only one possible embodiment of the invention. Other embodiments and modifications will, no doubt, occur to those skilled in the art. Thus, the examples given should only be interpreted as illustrations of some of the preferred embodiments of the invention, and the full scope of the invention should be determined by the appended claims and their legal equivalents.

I claim:

1. A tandem bicycle comprising:
   a bicycle frame suspended between a front wheel and a back wheel,
   a front seat for a front rider mounted on said bicycle frame, a rear seat for a rear rider mounted on said bicycle frame, said rear seat being situated behind said front seat,
   a steering means operable by both said front rider and said rear rider to steer said tandem bicycle, said steering means comprising a main handlebar coupled to said front wheel of said tandem bicycle, and a secondary handlebar coupled to said main handlebar,
   and a power transmission means operable by both said front rider and said rear rider to provide motive power to said tandem bicycle.

2. The tandem bicycle of claim 1 wherein said tandem bicycle is a close-coupled tandem bicycle with said rear seat positioned closely behind said front seat.

3. The tandem bicycle of claim 1 further comprising a front seat adjustment means for adjusting the up and down and front and back position of said front seat, and a rear seat adjustment means for adjusting the up and down and front and back position of said rear seat, such that the relative position of said front seat is adjustable with respect to said rear seat.

4. The tandem bicycle of claim 1 wherein said power transmission means comprises a front pedal crank operable by said front rider and a rear pedal crank operable by said rear rider, said front pedal crank and said rear pedal crank being coupled to said back wheel by a chain and sprocket transmission assembly.

5. A tandem bicycle comprising:
   a bicycle frame suspended between a front wheel and a back wheel,
   a front seat for a front rider mounted on said bicycle frame, a rear seat for a rear rider mounted on said bicycle frame, said rear seat being situated behind said front seat,
   a steering means operable by both Said front rider and said rear rider to steer said tandem bicycle, said steering means comprising a main handlebar coupled to said front wheel of said tandem bicycle, said main handlebar being operable by said rear rider, and a secondary handlebar coupled to said main handlebar, said secondary handlebar being operable by said front rider
   and a power transmission means operable by both said front rider and said rear rider to provide motive power to said tandem bicycle.

6. The tandem bicycle of claim 5 wherein said secondary handlebar extends in front of said main handlebar.

7. The tandem bicycle of claim 5 further comprising an adjustable positioning means for adjusting the position of said secondary handlebar with respect to said main handlebar.

8. The tandem bicycle of claim 7 wherein said adjustable positioning means comprises at least one telescoping extension tube connecting said secondary handlebar to said main handlebar and at least one clamp means for clamping said at least one telescoping extension tube to fix the position of said secondary handlebar with respect to said main handlebar.

9. A close-coupled tandem bicycle comprising:
   a bicycle frame suspended between a front wheel and a back wheel,
   a front seat for a front rider mounted on said bicycle frame, a rear seat for a rear rider mounted on said bicycle frame, said rear seat being positioned closely behind said front seat,
   a main handlebar coupled to said front wheel of said tandem bicycle, said main handlebar being operable by said rear rider, and a secondary handlebar coupled to said main handlebar, said secondary handlebar being operable by said front rider,
   and a front pedal crank operable by said front rider and a rear pedal crank operable by said rear rider, said front pedal crank and said rear pedal crank being coupled to said back wheel by a chain and sprocket transmission assembly.

10. The close-coupled tandem bicycle of claim 9 further comprising an adjustable positioning means for adjusting the position of said secondary handlebar with respect to said main handlebar.

11. The close-coupled tandem bicycle of claim 10 wherein said adjustable positioning means comprises at least one telescoping extension tube connecting said secondary handlebar to said main handlebar and at least one clamp means for clamping said at least one telescoping extension tube to fix the position of said secondary handlebar with respect to said main handlebar.

12. The close-coupled tandem bicycle of claim 9 further comprising a front seat adjustment means for adjusting the up and down and front and back position of said front seat, and a rear seat adjustment means for adjusting the up and down and front and back position of said rear seat, such that the relative position of said front seat is adjustable with respect to said rear seat.

* * * * *